(12) United States Patent
Shi et al.

(10) Patent No.: US 8,576,201 B2
(45) Date of Patent: Nov. 5, 2013

(54) STYLUS HAVING MAGNIFYING LENS

(75) Inventors: Zheng Shi, Shenzhen (CN); Guo-Wu Jiang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 246 days.

(21) Appl. No.: 13/095,001

(22) Filed: Apr. 27, 2011

(65) Prior Publication Data

US 2012/0262426 A1 Oct. 18, 2012

(30) Foreign Application Priority Data

Apr. 18, 2011 (CN) .......................... 2011 1 0095692

(51) Int. Cl.
*G06F 3/042* (2006.01)
(52) U.S. Cl.
USPC ........................................ 345/176; 178/19.01
(58) Field of Classification Search
USPC ........................................ 178/19.01; 345/179
See application file for complete search history.

(56) References Cited

U.S. PATENT DOCUMENTS

| | | | | |
|---|---|---|---|---|
| 2,234,942 A * | 3/1941 | Nichols | ........................ | 359/809 |
| 3,655,960 A * | 4/1972 | Andree | ........................ | 359/803 |
| 3,955,884 A * | 5/1976 | Del Pesco, Sr. | ............... | 359/804 |
| 5,074,695 A * | 12/1991 | DeRosa | ........................ | 359/809 |
| 2003/0063253 A1* | 4/2003 | Keene | .............................. | 351/41 |
| 2007/0047223 A1* | 3/2007 | Mundhra et al. | .............. | 362/103 |
| 2010/0090988 A1* | 4/2010 | Park | .............................. | 345/179 |

FOREIGN PATENT DOCUMENTS

| | | | | |
|---|---|---|---|---|
| DE | 20109055 | * | 10/2001 | ............. B43K 29/00 |
| EP | 0933038 | * | 8/1999 | ............. A45D 29/02 |
| JP | 57152034 A | * | 9/1982 | ............... G06F 3/03 |
| JP | 10-0145651 | * | 1/1998 | ............. A45D 29/02 |
| JP | 2002244051 A | * | 8/2002 | ............. G02B 25/00 |
| JP | 2006227461 A | * | 8/2006 | ............. G02B 25/00 |
| JP | 2010214935 A | * | 9/2010 | ............. B43K 29/00 |

OTHER PUBLICATIONS

Machine translation for DE 20109055, Droppelmann, K, "Magnifying lens pen for people with impaired vision comprises a magnifying lens placed on a normal pen so that the distance between the magnifying lens and the page can be individually adjusted", Pub. Oct. 18, 2001.*

* cited by examiner

*Primary Examiner* — Adam J Snyder
(74) *Attorney, Agent, or Firm* — Altis & Wispro Law Group, Inc.

(57) ABSTRACT

A stylus for a portable electronic device, includes a bar portion, a nib portion, and a lens member. The nib portion is formed at an end of the bar portion, the lens member is rotatably connected to the nib portion and used as a magnifying lens to better observe characters written using the stylus.

15 Claims, 4 Drawing Sheets

STYLUS HAVING MAGNIFYING LENS

CROSS-REFERENCE TO RELATED APPLICATIONS

This application is one of the three related co-pending utility patent applications and three allowed design patent applications listed below. All listed patent applications have the same inventors and assignee. All listed utility patent applications are concurrently filed herewith. The disclosure of each of the listed applications is incorporated by reference into all the other listed applications.

| Attorney Docket No. | Ser. No. | Title | Inventors | Current Status |
|---|---|---|---|---|
| US37121 | 29/380,862 | STYLUS HAVING FONT MAGNIFIER | Zheng Shi et al. | Notice of Allowance received |
| US37122 | N/A | STYLUS | Zheng Shi et al. | N/A |
| US37915 | 29/383,733 | STYLUS HAVING FONT MAGNIFIER | Zheng Shi et al. | Notice of Allowance received |
| US37916 | N/A | STYLUS | Zheng Shi et al. | N/A |
| US37917 | N/A | STYLUS | Zheng Shi et al. | N/A |
| US37918 | 29/383,734 | STYLUS HAVING FONT MAGNIFIER | Zheng Shi et al. | Notice of Allowance received |

BACKGROUND

1. Technical Field

This disclosure relates to a stylus for portable electronic devices.

2. Description of Related Art

Styluses are often used with touch screens of electronic devices. A stylus may include a main body and a nib portion formed at one end of the main body, and be configured for comfortably held and used by an average user. However, the typical pen-like configuration is often difficult for certain types of users to accurately use, such as users with vision deficiencies.

Therefore, there is room for improvement within the art.

BRIEF DESCRIPTION OF THE DRAWINGS

Many aspects of the stylus can be better understood with reference to the following drawings. The components in the drawings are not necessarily drawn to scale, the emphasis instead being placed upon clearly illustrating the principles of the multifunctional case.

DETAILED DESCRIPTION

Figure 1:
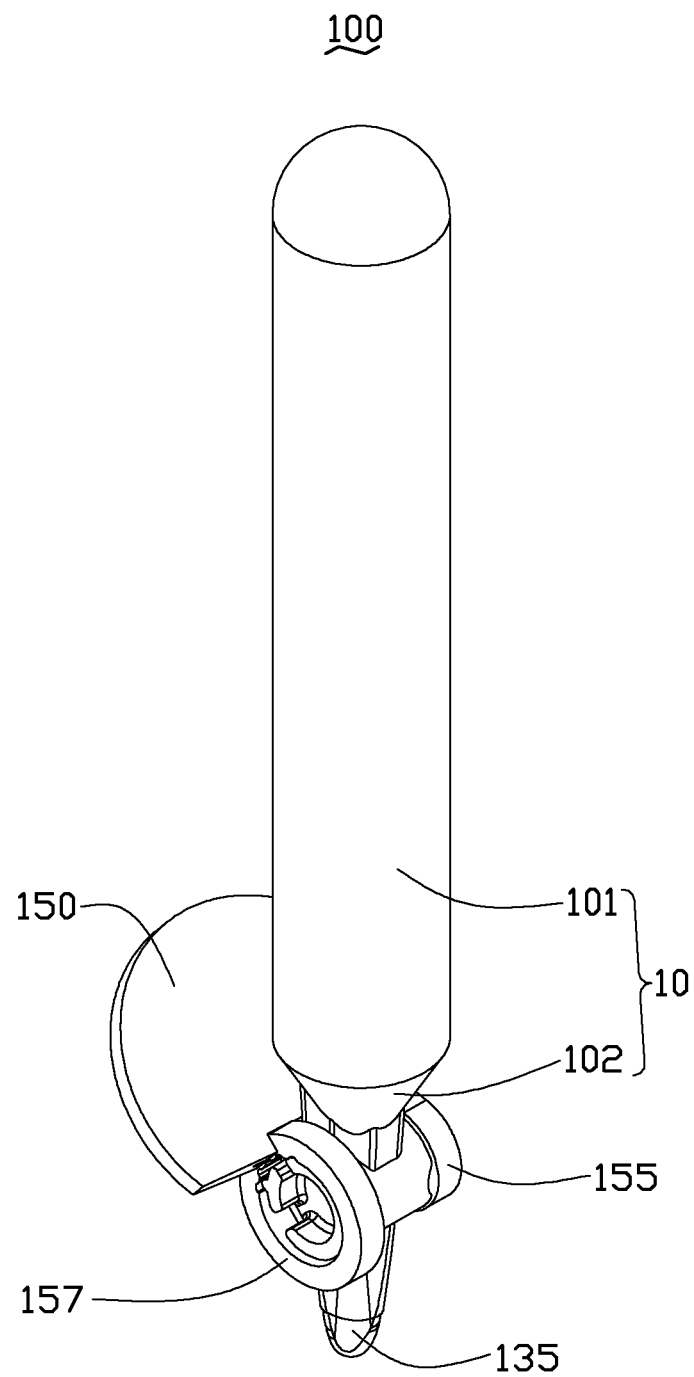
FIG. 1 is an integral assembled schematic view of a stylus according to an exemplary embodiment.

FIG. 1 shows an exemplary stylus 100 for a touch screen of a portable electronic device. The stylus 100 includes a bar portion 10, a nib portion 13 formed at an end of the bar portion 10, and a lens member 15 rotatably assembled on the nib portion 13.

Figure 2:
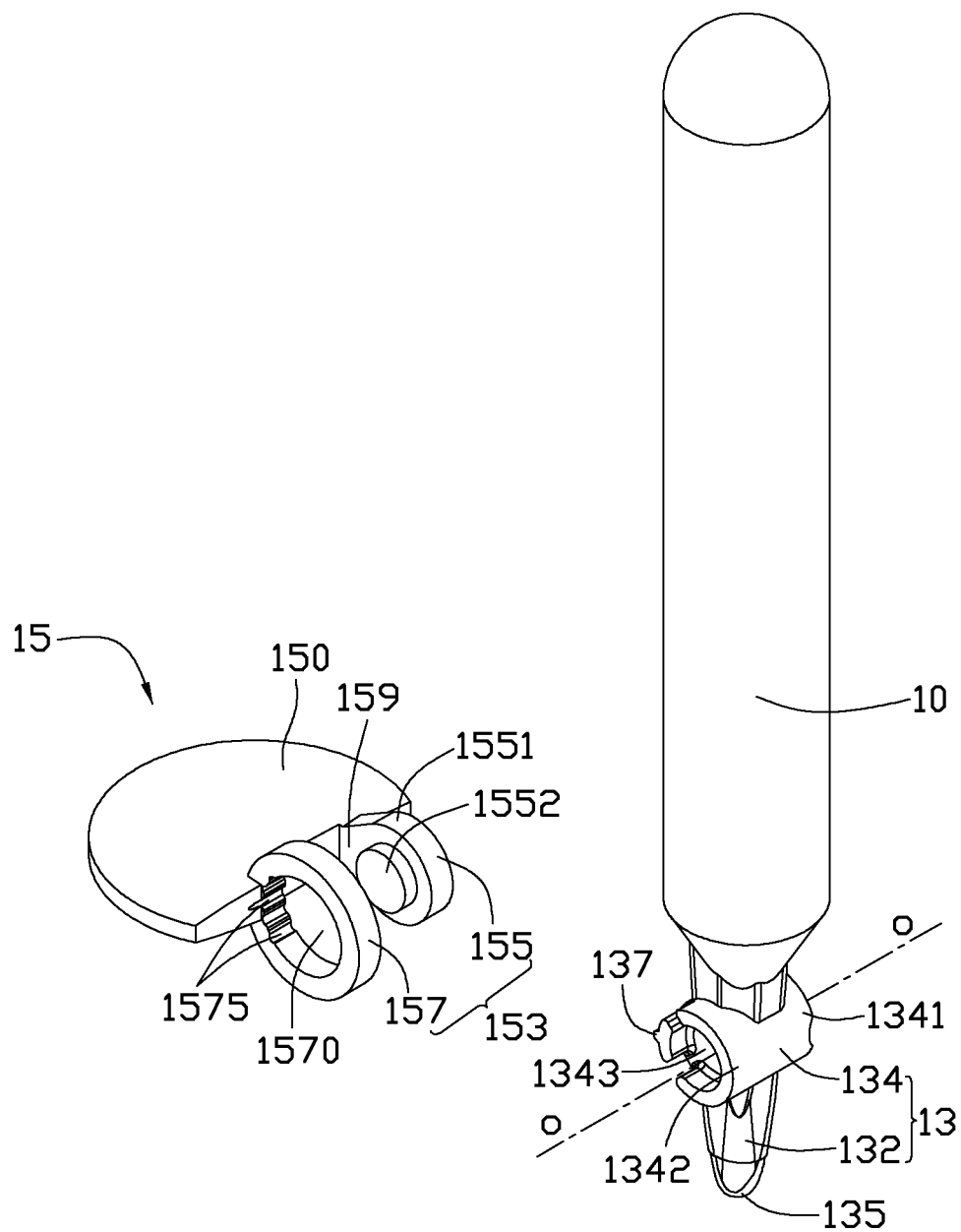
FIG. 2 is an exploded schematic view of the stylus shown in FIG. 1.
Figure 3:
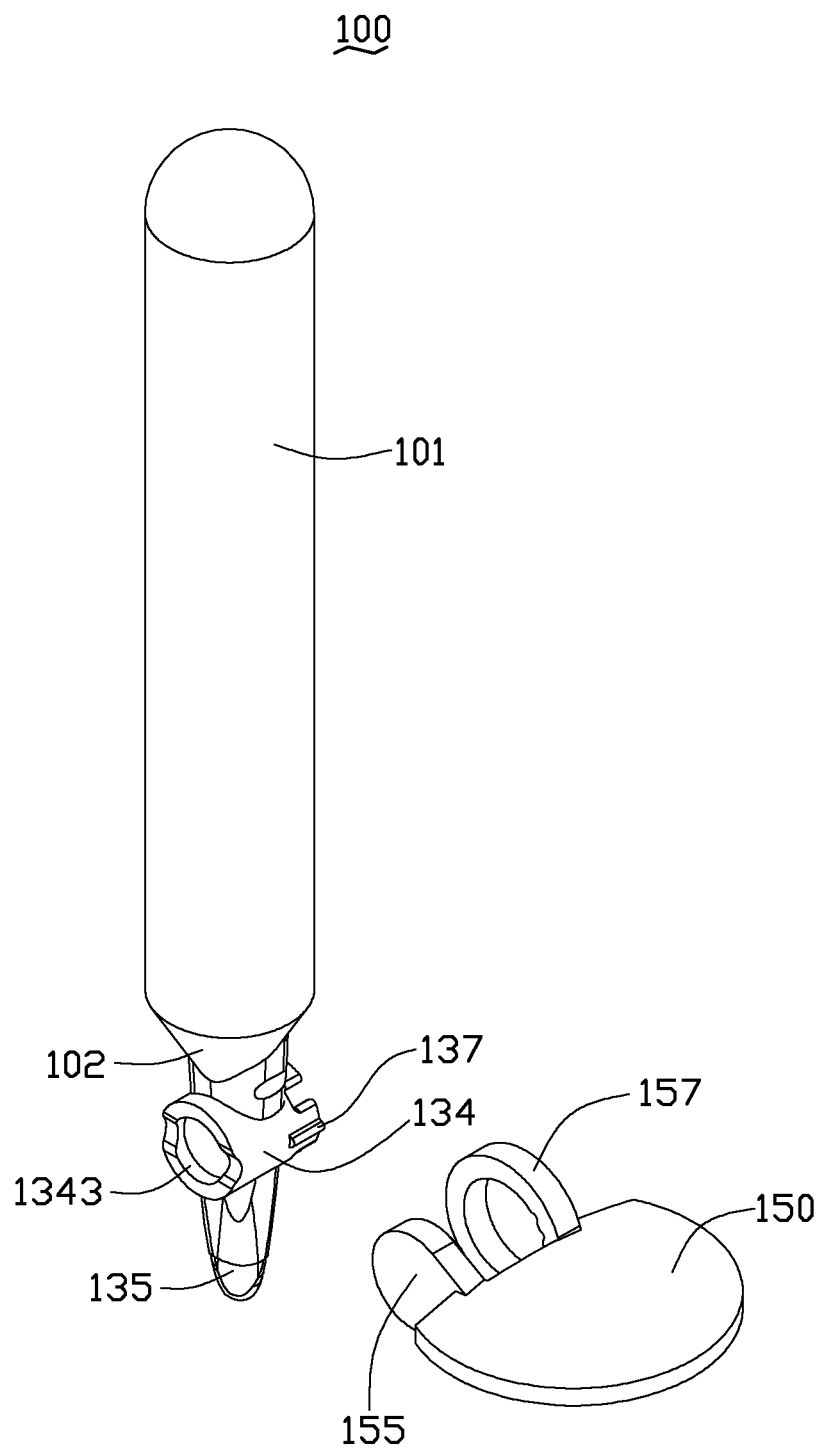
FIG. 3 is similar to FIG. 2, but viewed from a different angle.

Referring to FIGS. 2 and 3, the bar portion 10 includes a main section 101 and a connecting section 102 formed at an end of the main section 101. The main section 101 functions as a grip for users. The connecting section 102 tapers to transitionally connect the main section 101 to the nib portion 13.

The nib portion 13 includes a nib section 132 and a connecting seat 134 firmly positioned on the nib section 132. The nib section 132 integrally connects to and extends along the connecting section 102, and the nib section 132 has a nib end 135 for touching the screen of the electronic device. The connecting seat 134 is used to rotatably connect the lens member 15 to the bar portion 10. The connecting seat 134 is sleeve shaped and perpendicularly positioned on the nib section 132 to form a first connecting end 1341 and an opposite second connecting end 1342. Understandably, the connecting seat 134 can be integrally formed with the nib section 132 by injection molding, or can be a simple unit detachably assembled with the nib section 132. In the exemplary embodiment, the connecting seat 134 is integrally formed with the nib section 132. The connecting seat 134 has a central hole 1343 extending along an axis O-O and running through the first connecting end 1341 and the second connecting end 1342. A latching rib 137 is axially formed on the exterior surface of second connecting end 1342 to engage with the lens member 15.

The lens member 15 includes a lens portion 150 and a connecting portion 153 set at a side of the lens portion 150. The lens portion 150 is generally a semi circular shaped lens, and the lens portion 150 can be a concave lens and acts as a magnifying lens for the user when viewing through it. The connecting portion 153 made of elastic materials and includes a first connecting unit 155 and a second connecting unit 157 arranged oppositely with the first connecting unit 155 to form a clamp space 159. The first connecting unit 155 include a clamp plate 1551 and a protrusion post 1552 formed on the clamp plate 1551. The protrusion post 1552 has the same diameter as the central hole 1343 and can engage in the central hole 1343. The second connecting unit 157 can be an annular member and has a hinge hole 1570. The hinge hole 1570 has the same diameter as the connecting seat 134, and allows the connecting seat 134 to pass through. The second connecting unit 157 defines a plurality of axially parallel latching recesses 1575 in the inner circumference surface. The latching recesses 1575 can latch to the latching rib 137. The clamp space 159 is configured to receive the connecting seat 134.

Figure 4:
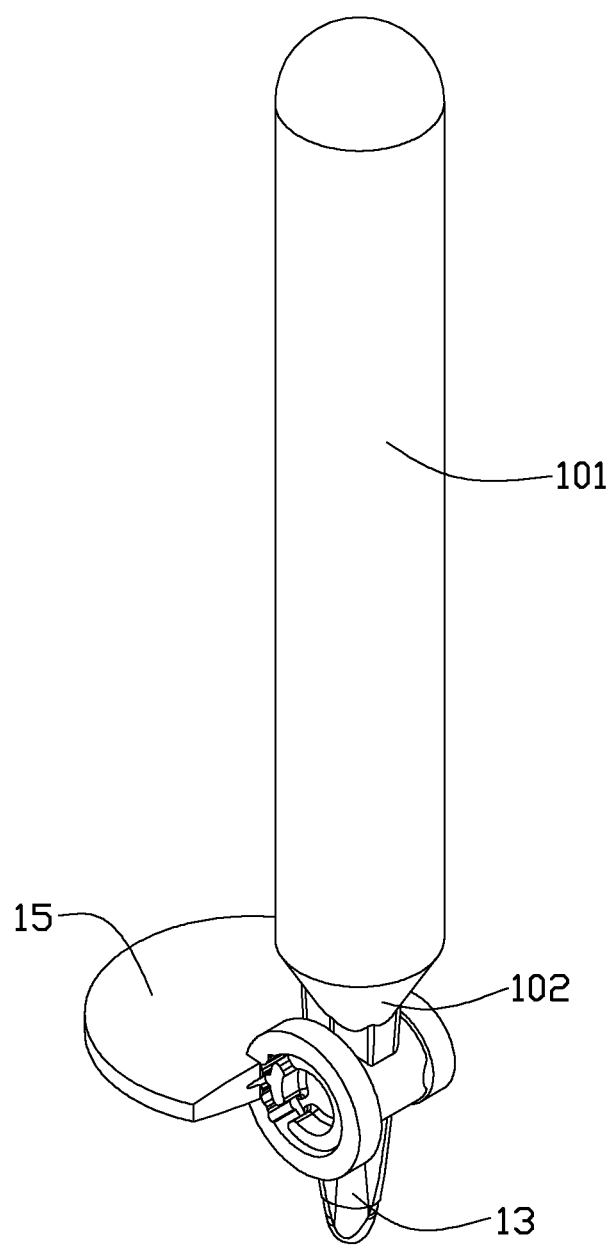
FIG. 4 is a schematic view of the stylus shown in FIG. 1 in use.

Referring to FIG. 4, to assemble the lens member 15 into the connecting seat 134, the first connecting unit 155 is deviated by an outer force to enlarge the clamp space 159. The first connecting end 1341 is inserted into the hinge hole 1570, and the latching rib 137 engages in one of the latching recesses 1575. Then, the outer force is released, and the first connecting unit 155 returns to original position and the protrusion post 1552 engages in the central hole 1343. Thus, the lens member 15 is assembled with the connecting seat 134. The stylus 100 is substantially assembled.

In use of the stylus 100, the lens member 15 can be adjusted and rotated to an optimum angle for viewing. The latching rib 137 slides from one of the latching recesses 1575 into another latching recess 1575. After rotating a predetermined angle, the latching rib 137 is latched with one of the latching recesses 1575, and the lens member 15 is secured relative to the nib portion 13. The user can view magnified images on the screen through the magnifying lens member 15, the magnified view aiding in more accurate touching of the touch screen with the stylus 100.

It is to be understood that, the connecting seat 134 can be fabricated separately, and the connecting seat 134 can be made of elastic material such as thermo plastic urethane (TPU). The connecting seat 134 defines a radial engaging hole (not shown) to receive a through passing of the nib section 132, securing the connecting seat 134 on the nib section 132. Thus, the nib portion 13 may include only the nib section 132, and the lens member 15 can further include the connecting seat 134. In assembly, the connecting seat 134 is assembled to the connecting portion 153, and then the connecting seat 134 is engaged with the nib section 132.

It is to be understood that even though numerous characteristics and advantages of the present exemplary embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stylus for a portable electronic device, comprising:
   a bar portion;
   a nib portion formed at an end of the bar portion, the nib portion comprising a nib section and a sleeve shaped connecting seat positioned on the nib section to form a first connecting end and an opposite second connecting end, the connecting seat comprising an axial central hole running through the first connecting end and the second connecting end; and
   a lens member rotatably connected to the connecting seat of the nib portion and used as a magnifying lens, the lens member comprising a lens portion and a connecting portion, the connecting portion comprising a first connecting unit and a second connecting unit opposite to the first connecting unit, the first connecting unit comprising a clamp plate and a protrusion post formed on the clamp plate, the protrusion post being received in the axial central hole of the connecting seat.

2. The stylus as claimed in claim 1, wherein the connecting seat is perpendicularly positioned on the nib section.

3. The stylus as claimed in claim 1, wherein the lens portion is a concave lens and acts as a magnifying lens.

4. The stylus as claimed in claim 1, wherein the first connecting unit and the second connecting unit are arranged oppositely to form a clamp space, the first connecting unit and the second connecting unit respectively engage with the first connecting end and the second connecting end, and the clamp space receives the connecting seat of the nib portion therein.

5. The stylus as claimed in claim 1, wherein the second connecting unit has a hinge hole to receive the second connecting end.

6. The stylus as claimed in claim 1, wherein the second connecting unit defines a plurality of latching recesses in the inner circumference surface, and a latching rib is axially formed on the exterior surface of the second connecting end to engage with one of the latching recesses.

7. The stylus as claimed in claim 6, wherein the latching rib slides from one of the latching recesses into another of the latching recesses to rotate the lens member.

8. The stylus as claimed in claim 1, wherein the connecting portion of the lens member is made of elastic materials.

9. A stylus for a portable electronic device, comprising:
   a bar portion;
   a nib portion formed at an end of the bar portion, the nib portion comprising a nib section; and
   a lens member rotatably and detachably connected to the nib portion and used to magnify images, the lens member comprising a lens portion, and a connecting portion set at a side of the lens portion, and a connecting seat positioned on the nib section to form a first connecting end and an opposite second connecting end, the connecting seat comprising an axial central hole running through the first connecting end and the second connecting end, the connecting portion comprising a first connecting unit and a second connecting unit opposite to the first connecting unit, the first connecting unit comprising a clamp plate and a protrusion post formed on the clamp plate, the protrusion post being received in the axial central hole of the connecting seat.

10. The stylus as claimed in claim 9, wherein the connecting portion rotatably connects to the connecting seat.

11. The stylus as claimed in claim 9, wherein the connecting seat is perpendicularly positioned on the nib section.

12. The stylus as claimed in claim 9, wherein the first connecting unit and the second connecting unit respectively engage with the first connecting end and the second connecting end, and the clamp space receives the connecting seat therein.

13. The stylus as claimed in claim 9, wherein the second connecting unit has a hinge hole to receive the second connecting end of the connecting seat.

14. The stylus as claimed in claim 9, wherein the second connecting unit defines a plurality of latching recesses in the inner circumference surface, and a latching rib is axially formed on the exterior surface of the second connecting end of the connecting seat to engage with the latching recesses.

15. The stylus as claimed in claim 14, wherein the latching rib slides from one of the latching recesses into another of the latching recesses to rotate the lens member.

* * * * *